May 22, 1923.
H. A. R. PETERMAN
VACUUM CLEANER
Filed Aug. 19, 1920
1,455,933
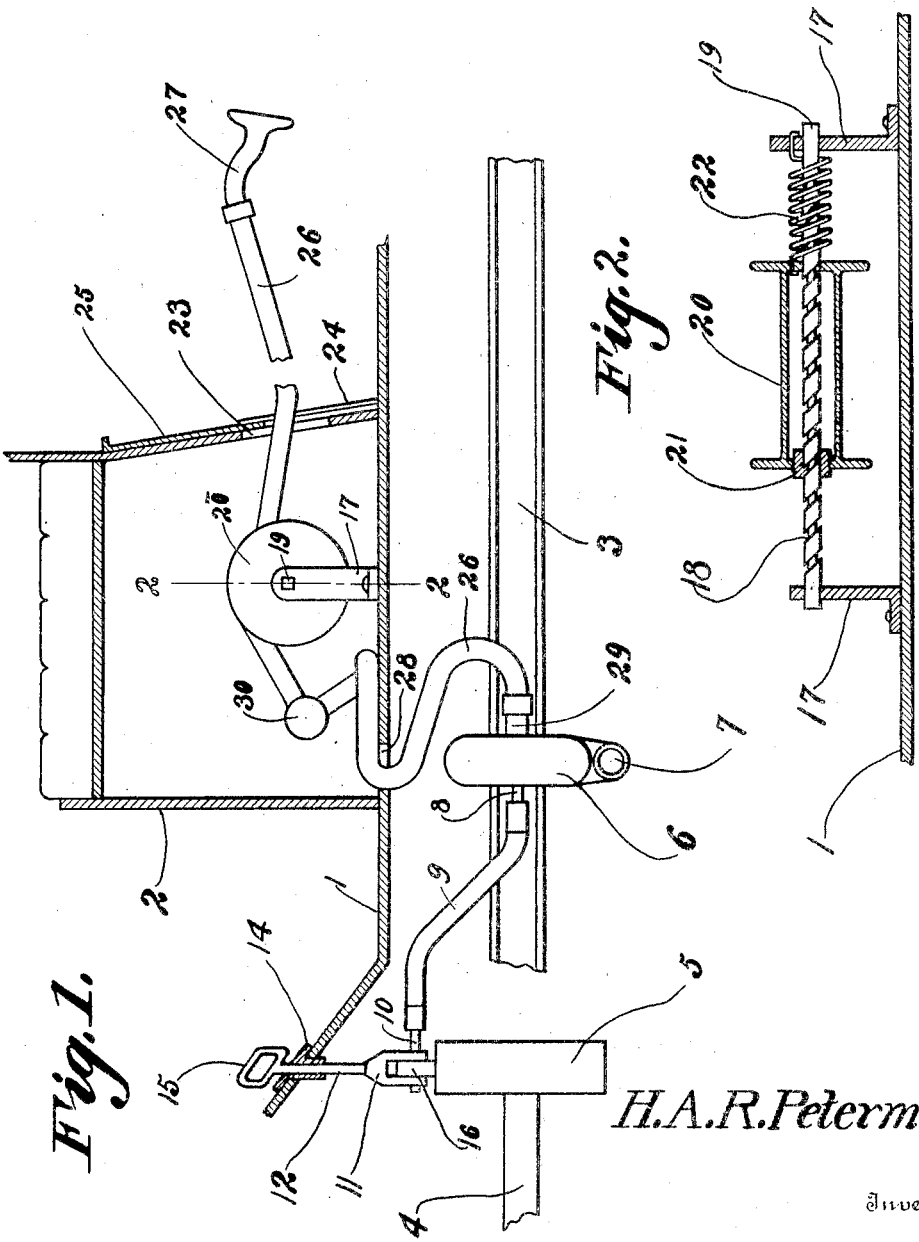
H.A.R. Peterman.
Inventor

Patented May 22, 1923.

1,455,933

UNITED STATES PATENT OFFICE.

HARRY A. R. PETERMAN, OF CHICAGO, ILLINOIS.

VACUUM CLEANER.

Application filed August 19, 1920. Serial No. 404,499.

*To all whom it may concern:*

Be it known that I, HARRY A. R. PETERMAN, a citizen of the United States, residing at Chicago, in the county of Cook and State of Illinois, have invented a new and useful Vacuum Cleaner, of which the following is a specification.

It is the object of this invention to provide a simple means whereby a vacuum cleaner may be mounted on an automobile, and be driven by the engine, the device being housed in an out of the way position when not in use.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in vertical section, a portion of an automobile whereunto the device forming the subject matter of this application has been applied, parts appearing in elevation; and Figure 2 is a section taken approximately on the line 2—2 of Figure 1, the flexible conduit being omitted.

In the accompanying drawings, the numeral 1 denotes the floor of an automobile, one seat appearing at 2. One of the chassis bars is shown at 3. The numeral 4 marks an engine shaft, the fly wheel being designated by the numeral 5.

In carrying out the invention there is provided a suction fan 6. The suction fan 6 may be mounted anywhere on the vehicle, as is found convenient. If desired, the fan 6 may be attached to the bar 3. The fan 6 includes an exhaust 7. The shaft of the fan is marked by the numeral 8. The suction fan 6 may be driven in any desired way from any part of the engine, or from any moving element on the vehicle. In the present instance, but not of necessity, the shaft 8 of the fan 6 is connected by a flexible shaft 9 to an axle 10 journaled in the fork 11 of an operating member 12 mounted to slide longitudinally in a thimble 14 mounted on the floor 1, the operating member being held against rotation in the thimble 14, so that a wheel 16, carried by the axle 10 and located within the fork 11, may cooperate properly with the fly wheel 5. The operating member 12 is supplied at its upper end with a handle 15 whereby the operating member may be raised and lowered, to bring the wheel 16 into and out of engagement with the wheel 5. The foregoing embodies merely one of the many ways in which the invention may be put into practice.

Standards 17 may be mounted on the floor 1, within the seat 2, or elsewhere, the seat forming a compartment. The ends of a shaft 19 are held in the standards 17. The shaft 19 is provided with a thread 18. A drum 20 is rotatably mounted on the shaft 19 and is supplied at one end with a nut 21 cooperating with the thread 18 of the shaft 19. Any suitable means may be provided for operating the drum 20. In the present instance, but not of necessity, a coil spring 22 is used, one end of the coil spring being attached to one of the standards 17, the other end of the coil spring being attached to said drum 20. An opening 23 may be formed in the rear portion of the seat 2, and, if desired, guides 24 may be located adjacent to the opening, a closure 25, in the form of a slide, being mounted to reciprocate in the guides 24, the closure controlling the opening 23. The numeral 26 designates a flexible tube or conduit provided at one end with a suction head 27. The tube or conduit 26 is wound about the drum 20 and is extended through an opening 28 in the floor 1, the conduit being connected to an inlet 29 of the suction device 6. In order to insure absolute flexibility in the conduit 26, a universal coupling 30 may be interposed in the coupling, if desired.

In practical operation, the spring 22 tends to rotate the drum 20 and to retract the free end of the conduit 26, along with the suction head 27, under the seat 2, or into any other compartment which is provided for the reception of the conduit. The door 25 may be closed after the conduit has been retracted underneath the seat 2. The door 25 may be opened, and the free end of the conduit 26 may be pulled outwardly, thus rendering the suction head 27 of use for clearing the cushions, the cover or any other part of the vehicle, or for cleaning the garments of the passengers, it being understood that the conduit 26 may be of sufficient length so that the garments of the passengers may be cleaned whilst the passengers are standing on the ground, outside of the car. The suction device 6 may be operated in any desired way, but let it be supposed that the wheel 16 is brought into operative relation to the fly wheel 5. Then the fly wheel 5 operates the shaft 9 by way of the axle 10 and the wheel 16, the shaft 8 of the fan 6 being operated. Dust and the like will be drawn into the conduit 26, through the suction head 27, and be discharged through the exhaust 7.

The device forming the subject matter of this application affords a simple means whereby power may be derived from the engine of an automobile to operate a suction device located on the automobile.

When the drum 20 is rotated on the shaft 19, the thread 18 cooperates with the nut 21 to impart endwise movement to the drum. The conduit 26, therefore is always so located that it will pay out freely through the opening 23.

Having thus described the invention, what is claimed is:—

The combination with the frame, fly wheel and seat of a motor propelled vehicle, of a winding member housed within the seat; a suction device mounted on the frame and including a flexible shaft and a wheel on the shaft; a flexible conduit connected to the suction device and engaged about the winding member; and means under the control of an operator for moving the flexible shaft to bring the wheel thereof into and out of engagement with the fly wheel.

In testimony that I claim the foregoing as my own, I have hereto affixed my signature in the presence of two witnesses.

HARRY A. R. PETERMAN.

Witnesses:
EARL MORRIS CARLSON,
DAVID H. BIEDERMAN.